A. C. MENGE.
INSECT DESTROYING DEVICE.
APPLICATION FILED AUG. 14, 1917.
1,299,372.
Patented Apr. 1, 1919.
3 SHEETS—SHEET 1.
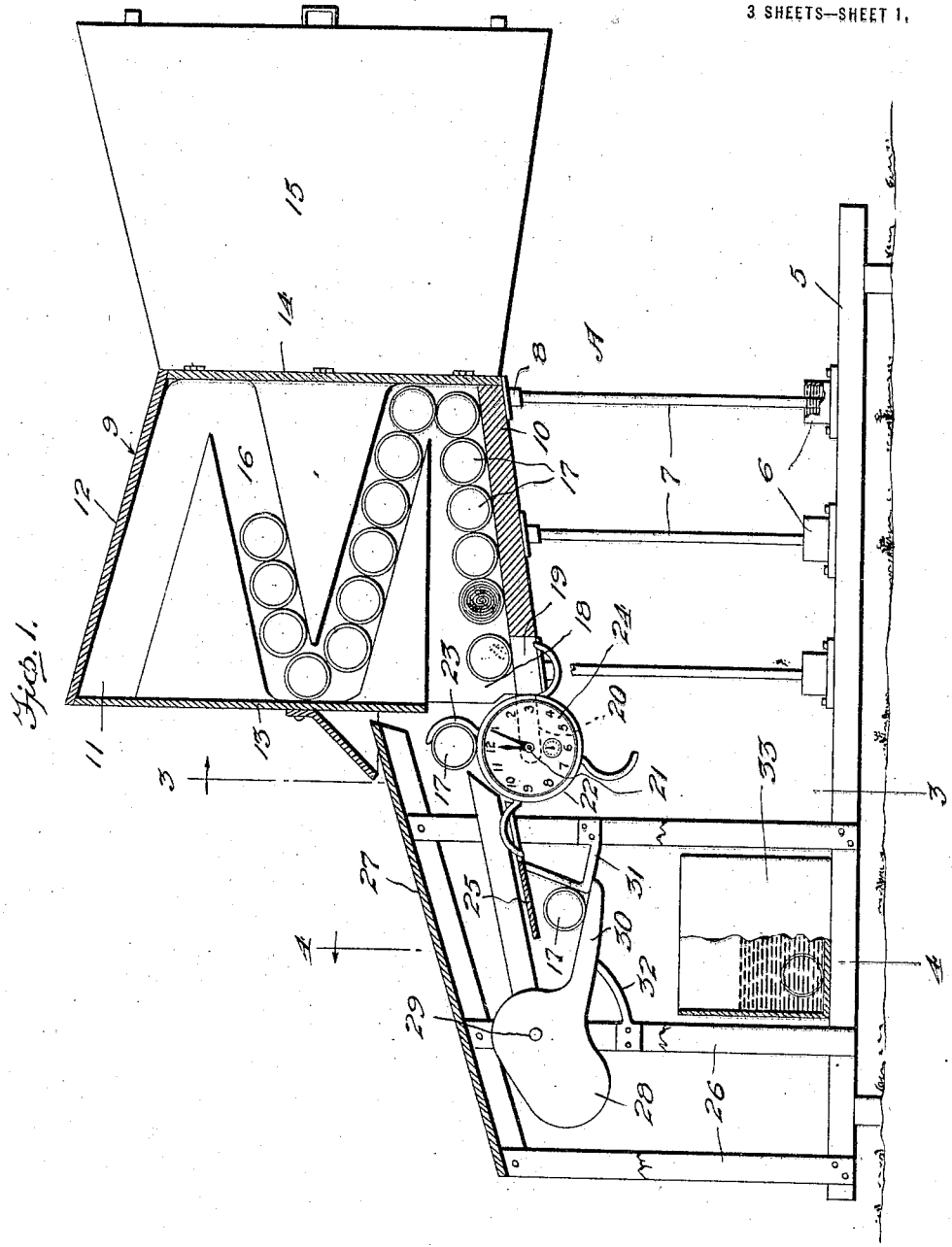
WITNESSES
INVENTOR
Anton C. Menge
BY Victor J. Evans
ATTORNEY

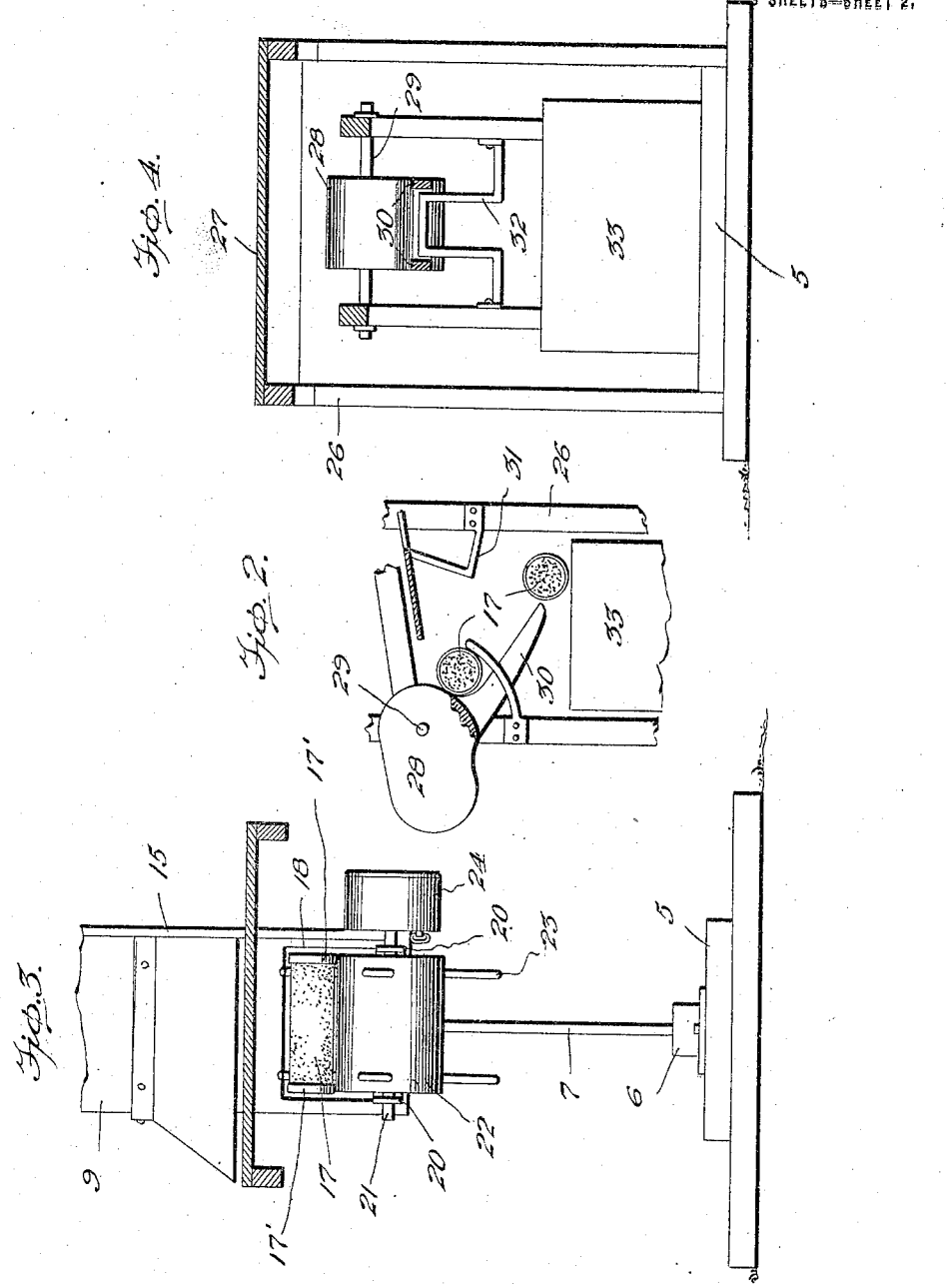

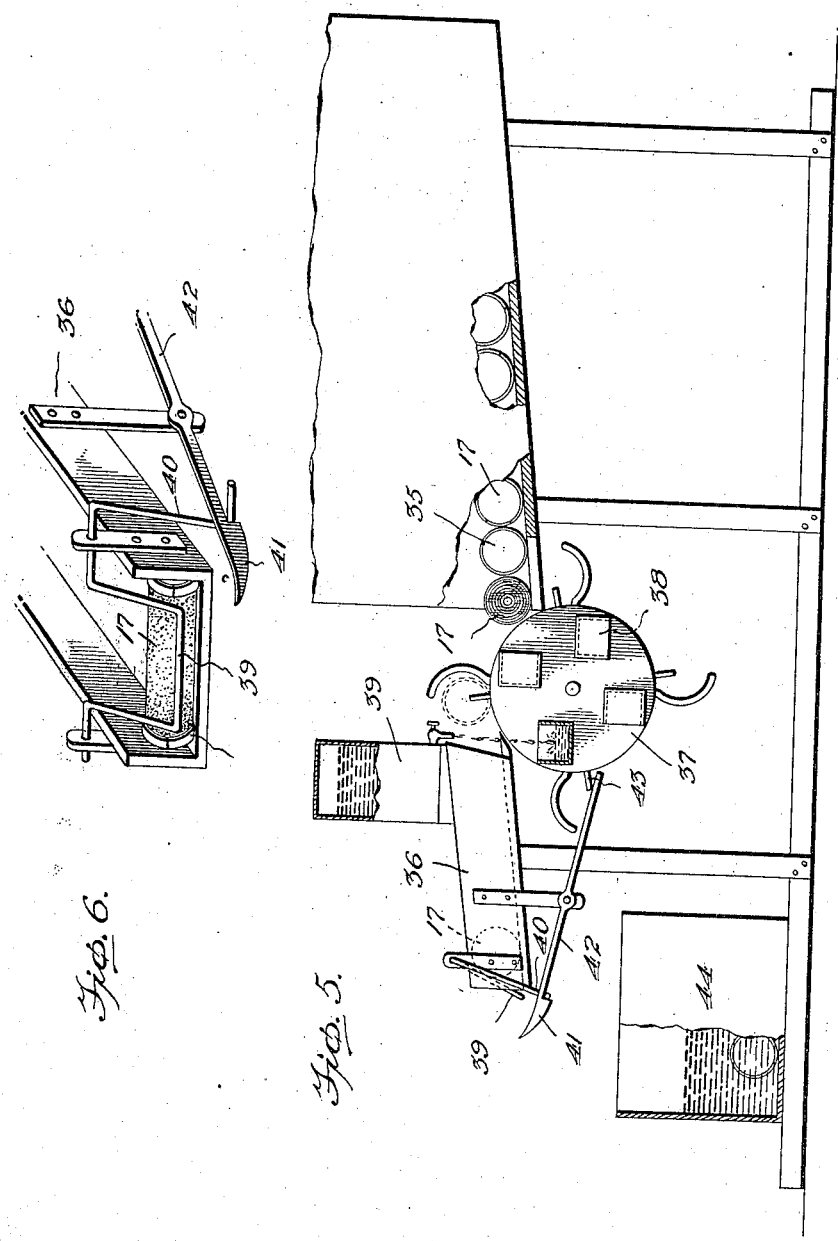

UNITED STATES PATENT OFFICE.

ANTON C. MENGE, OF MYRTLE GROVE, LOUISIANA, ASSIGNOR OF ONE-FOURTH TO CHARLES J. LAFITTE AND ONE-FOURTH TO ALBERT W. SHORT, BOTH OF MYRTLE GROVE, LOUISIANA.

INSECT-DESTROYING DEVICE.

1,299,372.        Specification of Letters Patent.      Patented Apr. 1, 1919.

Application filed August 14, 1917. Serial No. 186,170.

*To all whom it may concern:*

Be it known that I, ANTON C. MENGE, a citizen of the United States, residing at Myrtle Grove, in the parish of Plaquemines and State of Louisiana, have invented new and useful Improvements in Insect-Destroying Devices, of which the following is a specification.

This invention relates to an insect destroying device which may be employed to accomplish the destruction of winged and crawling pests, such as ants, beetles, flies and the like.

The primary object of the invention is to provide a portable and inexpensive device of this character wherein a plurality of baits for attracting the pests to be destroyed are withdrawn, one at a time, from a bait magazine and maintained in position exteriorly of the magazine for a sufficient length of time to permit a considerable number of the insects to alight thereon, after which the baits are deposited within a receptacle containing an insecticide.

Another object of the invention is to provide the device with a bait holder to receive the baits when withdrawn from the bait magazine which is so constructed and mounted, that when more than one bait has been deposited thereon, the bait holder will tilt and deposit the first bait which has been conveyed thereto into the receptacle containing the insecticide.

A further object of the invention is to provide a bait holder which has associated therewith an arm which when the bait holder is tilted under the weight of a plurality of baits deposited thereon prevents the bait last conveyed to the holder from being deposited within the receptacle containing the insecticide.

A still further object of the invention is to provide the device with mechanism for conveying the baits from the magazine to the bait holder which is so constructed that its continuous operation may be accomplished by hydraulic or mechanical means if found desirable.

With these and other objects in view, the invention resides in the novel combination and arrangement of parts, which will be hereinafter described and particularly pointed out in the claims.

The embodiments of the invention have been illustrated in the accompanying drawings, although no restriction is necessarily made to the precise details of construction therein shown, as changes, alterations, and modifications within the scope of the claims may be resorted to when desired.

In the drawings:—

Figure 1 is a view in side elevation, partly in section of the preferred form of an insect destroying device in which the door of the bait magazine is shown open.

Fig. 2 is an enlarged view of a portion of the preferred form of the device showing the bait holder in tilted position.

Fig. 3 is a vertical transverse section on the line 3—3 of Fig. 2.

Fig. 4 is a section similar to Fig. 3 taken on the line 4—4 of Fig. 2.

Fig. 5 is a view and side elevation with parts broken away of a modified form of the invention.

Fig. 6 is a detail perspective view of a portion of the bait holder shown in Fig. 5 in the drawings and the mechanism for maintaining the baits therein.

Like characters of reference denote corresponding parts throughout the several views in the drawings.

Referring now in detail to Figs. 1 to 4 inclusive, the letter A designates a pest destroying device constructed in accordance with the invention wherein a base 5 has mounted thereon a plurality of cups 6 adapted to contain a suitable insecticide and with each cup having extending upwardly therefrom a central standard 7 provided at its upper end with a flanged head 8.

A bait magazine 9 has its base 10 secured to the heads 8 and comprises a side wall 11, an inclined top 12, end walls 13 and 14, and a door 15 for closing the open side of the magazine.

The magazine 9 has formed therein a longitudinally extending and zigzag channel 16, the lower wall of which serves as a support for a plurality of cylindrical baits 17 which under the influence of gravity are caused to roll toward an outlet opening 18 at the lower end of the end wall 14 of the magazine and adjacent which the base 10 has formed therein a pair of spaced slots 19. Each bait 17 is formed from a roll of absorbent material such as cotton gauze or the like with the cotton gauze preferably saturated with some sticky material and held in roll formation by split bands 17'.

The base 10 has connected therewith a pair of spaced arms 20 which extend beyond the end wall 14 of the magazine and have mounted to turn therein a shaft 21 to which is fixed a drum 22 having extending radially therefrom spaced and curved fingers 23 arranged in pairs and which during the rotation of the drum by suitable mechanism provided for this purpose which in this instance has been shown as a spring motor 24 are caused to pass through the slots 19 and within the channel 16 in the magazine to engage a bait 17 and convey the bait to an inclined chute 25.

The chute 25 is supported within a frame work 26 mounted upon the base 5 and provided with an inclined cover 27 overlying the chute and extending beyond a bait holder 28. The bait holder 28 which closes an end of the chute 25 is mounted to rock upon a shaft 29 supported by the frame work 26, with the bait holder having formed thereon a pair of spaced arms 30 which extend beneath the bottom of the chute therefor, normally engage a support 31 therefor, which serves as a stop to limit the tilting movement of the bait holder in one direction.

The arms 30 on the bait holder are arranged upon opposite sides of a curved bait retaining bar 32 secured to the frame work 26 below the holder, so that when a plurality of the baits have been conveyed to the arms 30 through the rotation of the drum 22, the weight of the baits will be sufficient to turn the holder about its pivotal connection and cause the bar 32 to pass between the baits on the arm and retain the bait last positioned upon the holder thereon as the other bait rolls from the holder and into a receptacle 33 containing an insecticide.

As one of the baits 17 rolls from the arms 30, the weight of the body portion of the holder is sufficient to counter-balance the weight of the bait retained thereon and the arms and swing the holder to its normal position at which time the bait retained upon the holder being free from engagement with the bar 32 rolls on the arms 30 into contact with the support 31.

When it is desired to employ the invention shown in Figs. 1 to 4 in the drawings for the destruction of destructive pests, the baits are arranged in the zigzag channel in the magazine as shown.

The motor 24 is now wound to cause the drum 22 to rotate, so that the fingers thereon will at predetermined intervals convey a bait from the magazine to the chute 25. The first bait which is conveyed to the chute rolling along the same until it drops upon the arms 30 and rolls into contact with the support 31. The bait which is resting upon the arms 30 being the only one which is exposed attracts the pests which it is desired to destroy in great numbers, until another bait is conveyed to the chute and drops upon the arms 30, at which time the bait holder will tilt and the bait which was first deposited thereon will be dropped into the receptacle 34 for the destruction of the insects adhering thereto.

In the modified form of the invention shown in Figs. 5 and 6 in the drawings the baits 17 are conveyed one at a time from a bait magazine 35 to an inclined chute 36 by a rotatable drum 37 substantially the same in construction as the drum 22, with the exception that the drum 37 has mounted thereon a plurality of buckets 38 which are adapted to receive therein the drippings from a liquid receptacle 39 mounted upon the chute 36 whereby the liquid in the receptacle 39 may be employed to continuously rotate the drum 37 for the conveying of the baits 17 from the magazine 35 to the chute 36 at predetermined intervals.

At the discharged end of the chute 36 is mounted to swing a gate 39 having formed thereon an actuating arm 40 arranged exteriorly of the chute 36 and adapted to be engaged by the locking nose 41 on a latch bar 42 pivotally mounted on the chute 36. The drum 37 has extending radially therefrom a plurality of fingers 43 which during the rotation of the drum engage the latch bar 42 and release the same from contact with the arm 40, so that the bait 17 in the chute 36 under the influence of gravity will move the gate to open position and drop within a tank 44 containing an insecticide and arranged below the discharge end of the chute 36.

From the foregoing description, taken in connection with the accompanying drawings, it is at once apparent that a device for exterminating insects has been provided which though comparatively inexpensive of manufacture, is highly efficient for the purpose set forth.

Having thus described the invention, what is claimed as new, is:—

1. An insect destroying device comprising a hopper, adhesive coated baits therein, a receptacle containing insecticide, means for conveying the baits from the hopper to the receptacle, said means including a drum, fingers thereon for engaging the baits, means for rotating the drum and means for regulating the speed of said drum, and means associated with the conveying means for causing each bait to pause for a limited period.

2. In an insect destroying device, spaced receptacles, baits within one of said receptacles, means for withdrawing said baits from the said receptacle, and means to receive the baits withdrawn from the said receptacle operable under the weight of a plurality of the baits to deposit the same one at a time in the other of the receptacles.

3. An insect destroying device comprising a magazine, baits within the magazine, means for withdrawing said baits from the magazine, a receptacle, and a bait holder to receive the baits withdrawn from the magazine mounted to tilt under the influence of a plurality of said baits and to deposit one of the baits thereon when tilted into said receptacle.

4. An insect destroying device comprising a base, a magazine on said base, baits within said magazine, means for withdrawing said baits from said magazine, a receptacle on said base, a bait holder to receive the baits withdrawn from said magazine mounted to tilt under the influence of a plurality of the baits and deposit one of the baits thereon into said receptacle, and a retaining bar on said base to engage with the other bait on the holder and retain the same thereon while the bait holder is tilted.

In testimony whereof I affix my signature.

ANTON C. MENGE.